Jan. 23, 1962
A. O. HANSON
3,018,114
SPIDER CENTER
Filed Dec. 16, 1958
2 Sheets-Sheet 1
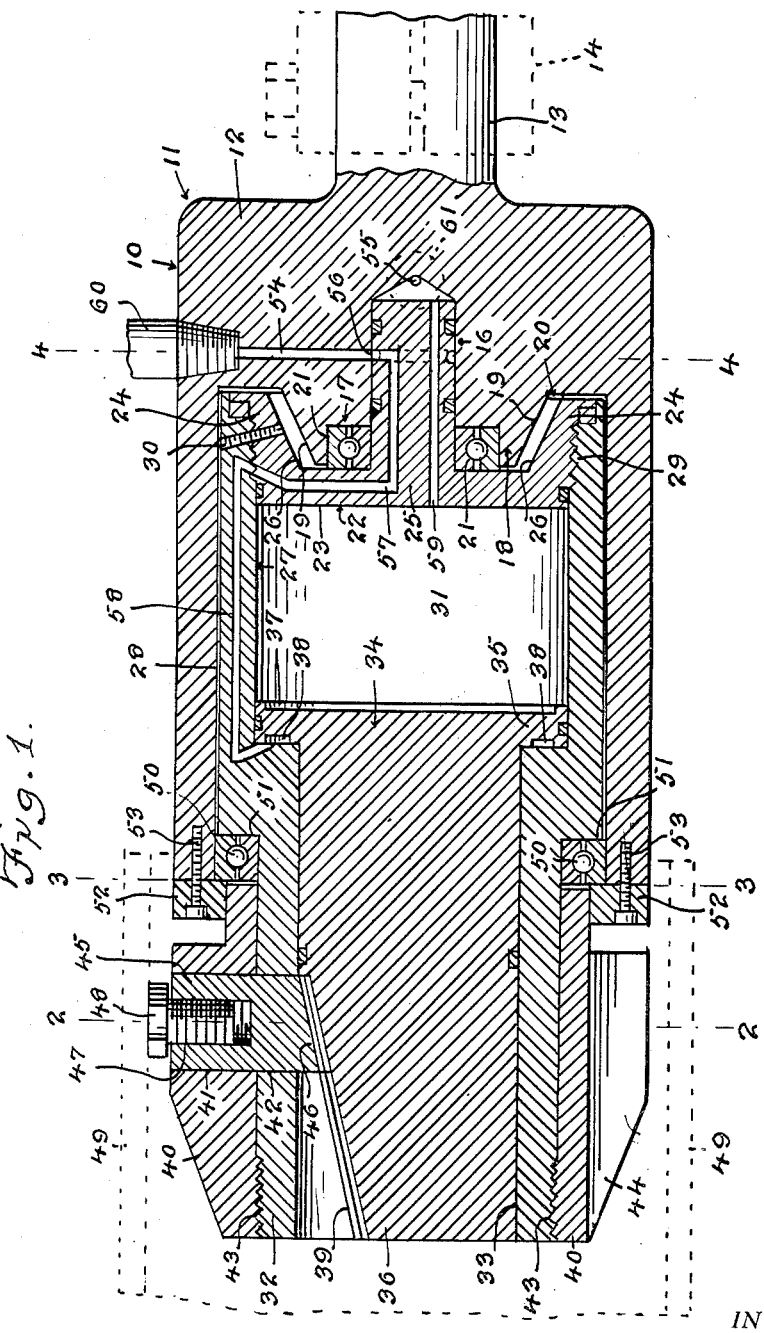
INVENTOR.
Arthur O. Hanson
BY Victor J. Evans &Co.
ATTORNEYS Jan. 23, 1962
A. O. HANSON
3,018,114
SPIDER CENTER
Filed Dec. 16, 1958
2 Sheets-Sheet 2
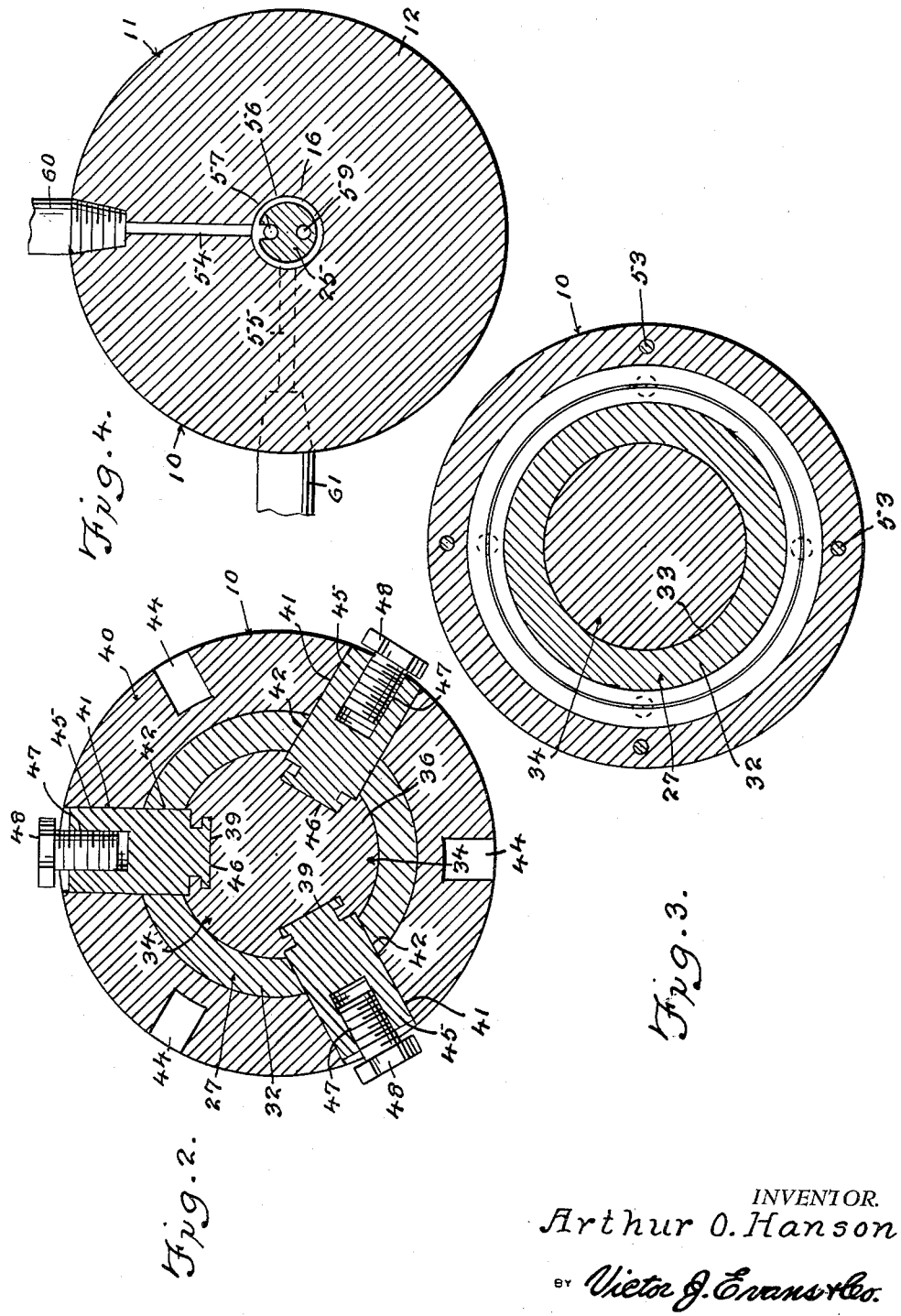
INVENTOR.
Arthur O. Hanson
BY Victor J. Evans & Co.
ATTORNEYS 3,018,114
SPIDER CENTER
Arthur O. Hanson, 9845 E. La Rosa Drive,
Temple City, Calif.
Filed Dec. 16, 1958, Ser. No. 780,833
1 Claim. (Cl. 279—4)

This invention relates to a tool accessory, and more particularly to a spider center for use with a lathe.

The primary object of the present invention is to provide a hydraulic spider center which is adapted to be used in the tail stock of a lathe so as to support a work piece against a cutting tool.

Another object of the invention is to provide a spider center which is adapted to be connected to a lathe whereby a work piece can be readily gripped and supported.

A still further object of the invention is to provide a spider center which can be operated by a suitable mechanism such as a suitable source of air under pressure, and wherein the spider center includes members which are mounted for movement into and out of engagement with the work piece so that the work piece can be readily held or released as desired.

A further object of the invention is to provide a spider center which is extremely simple and inexpensive to manufacture.

Other objects and advantages of the invention will be apparent in the course of the following description.

In the accompanying drawings, forming a part of this application and in which like numerals are used to designate like parts throughout the same, FIGURE 1 is a longitudinal sectional view taken through the spider center of the present invention.

FIGURE 2 is a sectional view taken on line 2—2 of FIGURE 1.

FIGURE 3 is a sectional view taken on line 3—3 of FIGURE 1.

FIGURE 4 is a sectional view taken on line 4—4 of FIGURE 1.

Referring in detail to the drawings, the numeral 10 indicates the spider center of the present invention which comprises a stationary body member as indicated generally by the numeral 11. The body member 11 embodies a main body portion 12 and a shank 13, and the shank 13 is adapted to be held in the conventional spindle tail stock 14 of a lathe, the shank 13 may be held in place by means of a securing element such as a tongue and the taper shank.

The body member 11 is provided with an inner recessed portion that includes a first cylindrical section 16, FIGURE 1, and there is further provided a second section 17 which communicates with the first section 16. The numeral 18 indicates a shoulder which is provided with an annular inclined surface 19, and the numeral 20 indicates a third annular section which is contiguous to the shoulder 18. A ball bearing assembly 21 is seated in the second section 17.

There is further provided a base which is indicated generally by the numeral 22 and the base 22 includes a flat portion 23 as well as a cylindrical stem 25 which extends into the recessed section 16. The base 22 is further provided with an annular lip 24 that is arranged contiguous to the recessed section 20. The lip 24 is provided with an inclined or beveled surface 26 which is arranged in opposed relation with respect to the inclined surface 19.

There is further provided a support member which is indicated generally by the numeral 27, and the support member 27 has an end 28 seated within a recessed portion of the body member 11. The support member 27 is threadedly connected to the base 22 as at 29. The numeral 30 indicates the securing element which serves to fasten the support member 27 and base 22 together. The support member 27 is provided with an inner chamber 31, and the support member also includes an outer end 32 of reduced diameter which is provided with a longitudinally extending inner bore 33 that communicates with the chamber 31. The numeral 34 indicates a movable piston which is slidably arranged in the support member 27, and the piston 34 includes a head 35 that is slidably mounted in the chamber 31. The piston 34 further includes a plunger 36 which is mounted for reciprocatory movement in the bore 33. Grooves or recesses 37 and 38 are arranged on opposite sides of the head 35 for a purpose to be later described. The plunger 36 of the piston 34 is provided with a plurality of spaced apart inclined keyways 39, and the numeral 40 indicates a collar which is mounted on the end portion 32 of the support member 27. The collar 40 and end 32 are provided with registering openings 41 and 42. The collar 40 is threaded onto the end 32 as at 43, and the collar is further provided with a plurality of spaced apart slots 44 whereby a suitable tool such as a spanner wrench can be arranged in engagement with the slots 44 as for example when the collar 40 is to be removed. The numeral 45 indicates suitable bushings for jaws which are arranged in the openings 41 and 42, and keys 46 are formed on the inner ends of the bushings 45 for engagement with the keyways 39. Each bushing 45 is provided with a threaded aperture 47, and a screw member 48 is arranged in threaded engagement with each aperture 47. The screw members 48 are adapted to engage the inner surface of a work piece such as the work piece 49 which may be a pipe or the like.

The numeral 50 indicates a ball bearing assembly which is arranged contiguous to a shoulder 51 on the support member 27, and a circular plate 52 is provided for retaining the ball bearing assembly 50 in its proper position. The plate 52 is fastened to the body member 11 by means of securing elements 53.

The body member 11 is provided with spaced apart first and second channels 54 and 55, and each channel has its inner ends communicating with the recessed portion 16, whereby an actuating medium such as compressed air can be supplied to the working mechanism. The stem 25 is provided with an annular groove 56 which communicates with the inner end of the channel 54, and the numeral 57 indicates a passageway 58 in the support member 27. The base 22 is also provided with a longitudinally extending aperture 59 therein. The numerals 60 and 61 indicate conduits which are connected to the channels 54 and 55 whereby a suitable actuating means such as air under pressure can be supplied to and from a suitable source of supply such as a reservoir tank.

It is to be understood that while air has been described as the actuating means, that other actuating mediums such as hydraulic fluid can be used instead of using air under pressure.

From the foregoing, it is apparent that there has been provided a spider center which is especially suitable for use with a lathe as for example when work pieces are to be held. In use, the spider center 10 is adapted to be arranged as shown in the drawings so that the shank 13 of the body member 11 is gripped in the lathe chuck 14. The work piece 49 is indicated in broken lines in FIGURE 1, and it is to be noted that when the device 10 is actuated, the screw members 48 can move outwardly to engage the inner surface of the work piece 49 so that this work piece 49 can be held in the desired position to be worked on. Then, when the work piece 49 is to be released, the screw members 48 can move inwardly so as to release the gripping action on the work piece 49.

The operation of the device is as follows:

With the parts in the position in FIGURE 1 for example, it will be seen that a suitable actuating medium such as air under pressure can be supplied to the conduit 60, and this air will then pass through the channel 54, and then enter the groove 56. This air will then pass through the passageway 57 and then through the passageway 58 and then enter the groove 38. This compressed air will thus force the piston 34 from left to right in FIGURE 1. The air which is in the chamber 31 will be forced out from left to right through the aperture 59, and this air from the aperture 59 will then pass out through the channel 55 and then through the conduit 61. It is to be understood that suitable valves as well as pumps, storage tanks, can be used for providing the compressed air or hydraulic fluid that passes through the conduits 60 and 61.

To reverse the procedure, air under pressure is conveyed inwardly through the conduit 61, and this air then passes from right to left through the aperture 59 and then through the chamber 31 so as to move the piston 34 to the position shown in FIGURE 1. At the same time the air which is on the opposite side of the head 35 will pass through the passageway 58 and through the passageway 57, and this air will then pass through the channel 54 and out through the conduit 60.

As the piston 34 moves back and forth, it will be seen that the bushing 45 will move in or out through the registering openings 41 and 42, since the keys 46 on the inner ends of the bushings 45 are connected to the inclined keyways 39 on the plunger 36. Since the screw members 48 are connected to the bushings 45, it will be seen that this actuation of the piston 34 will cause the screw members 48 to move in or out so that these members can either be used for gripping the work piece 49, or else these members can be released from gripping engagement with the work piece. The screw members 48 can be rotated in the threaded aperture 47 so that the position of the screw members 48 can be varied or changed as desired and this insures that the unit will be adaptable for work pieces of different diameters.

The body member 11 remains stationary since it is connected to the lathe tail stock spindle. However, the collar 40, as well as the support member 27 and base 22 rotate with respect to the stationary body member 11 and the position of the ball bearing assembly such as the assembly 50 and 21 helps insure that there will be a minimum amount of friction between the various parts.

Suitable sealing O-rings can be used wherever desired or required.

The parts can be made of any suitable material and in different shapes or sizes.

The spider center of the present invention is adapted to be actuated by the air under pressure, and it will simplify the turning and set up time of lathe work for tubes, pipes, castings or other parts that have to be turned true to the inside bore. The bushings or lugs move in or out so that the work can be conveniently held in place when desired.

The hydraulic spider center is to be used in the tail stock of a lathe and it is to be fitted into the spindle of the tail stock. The principal object of the hydraulic spider center is to support the work piece against the cutting tool. The work piece (a hollow piece) is held in a four jaw or a three jaw chuck.

The hydraulic spider center works good on oil pressure because the oil lubricates the seals (O-rings) and the other moving parts in the center. A small oil reservoir may be built into the air pressure line outside the center. The work piece may be held in a four jaw chuck in one end and supported with the hydraulic spider center in the other end.

I claim:

A spider center comprising a body member embodying a main body portion, a shank extending from said body member and provided with an inner recessed portion which embodies a first section, there being a second section communicating with said first section, a shoulder adjacent said second section provided with an outer inclined surface, there being a third section adjacent said shoulder, a base adjacent said shoulder and embodying a stem which extends into said first section, said base embodying a flat portion and an annular lip which projects into said third section, a support member provided with an inner end positioned within the recessed portion of said body member, there being a chamber in said support member, the outer end of the support member being provided with an inner bore which communicates with said chamber, a piston including a head slidably positioned in said chamber, said piston embodying a plunger slidably arranged in said bore, said plunger being provided with keyways, a collar mounted on the outer end of said support member, there being registering openings in said collar and support member, movable jaws arranged in said openings and connected to said keyways, screw members arranged in engagement with said jaws, there being spaced apart channels in said body member communicating with said first recessed section, there being an annular groove in said stem registering with said channels, and connecting passageways in said base and support member.

References Cited in the file of this patent

UNITED STATES PATENTS

| | | |
|---|---|---|
| 1,180,355 | White | Apr. 25, 1916 |
| 2,462,465 | Casella | Feb. 22, 1949 |
| 2,501,684 | Landreth | Mar. 28, 1950 |
| 2,511,827 | Adair | June 20, 1950 |
| 2,814,496 | Damijonaitis | Nov. 26, 1957 |
| 2,860,881 | Perrachione | Nov. 18, 1958 |
| 2,880,009 | Gamet | Mar. 31, 1959 |